United States Patent
Ramsl

(10) Patent No.: US 11,837,000 B1
(45) Date of Patent: Dec. 5, 2023

(54) OCR USING 3-DIMENSIONAL INTERPOLATION

(71) Applicant: SAP SE, Walldorf (DE)

(72) Inventor: Hans-Martin Ramsl, Mannheim (DE)

(73) Assignee: SAP SE, Walldorf (DE)

( * ) Notice: Subject to any disclaimer, the term of this patent is extended or adjusted under 35 U.S.C. 154(b) by 87 days.

(21) Appl. No.: 17/746,451

(22) Filed: May 17, 2022

(51) Int. Cl.
 *G06V 30/16* (2022.01)
 *G06V 30/18* (2022.01)

(52) U.S. Cl.
 CPC .......... *G06V 30/16* (2022.01); *G06V 30/1801* (2022.01)

(58) Field of Classification Search
 CPC ................................................ G06V 30/00–43
 See application file for complete search history.

(56) References Cited

U.S. PATENT DOCUMENTS

| | | | | |
|---|---|---|---|---|
| 2015/0003666 A1* | 1/2015 | Wang | ................... | G06V 30/414 382/100 |
| 2015/0278593 A1* | 10/2015 | Panferov | ............ | G06V 30/1914 382/182 |
| 2015/0379343 A1* | 12/2015 | Powell | ................... | G06F 18/251 382/229 |
| 2019/0065877 A1* | 2/2019 | Kalyuzhny | ............ | G06V 20/46 |

OTHER PUBLICATIONS

U.S. Appl. No. 17/862,091, filed Jul. 11, 2022, Image Segmentation for Anonymization for Image Processing.
U.S. Appl. No. 17/860,912, filed Jul. 8, 2022, Automatic Data Card Generation.
"Bipartite graph", Wkipedia, [Online]. Retrieved from the Internet: < URL: https://en.wikipedia.org/wiki/Bipartite_graph>, (Accessed Jun. 23, 2022), 10 pgs.
Guo, Qingyu, et al., "A Survey on Knowledge Graph-Based Recommender Systems", arXiv:2003.00911v1, (Feb. 28, 2020), 17 pgs.

(Continued)

*Primary Examiner* — Sean T Motsinger
(74) *Attorney, Agent, or Firm* — SCHWEGMAN LUNDBERG & WOESSNER, P.A.

(57) ABSTRACT

To perform 3-dimensional interpolation, a 3-dimensional model of an input text character is generated. For example, a 2-dimensional character may be given depth using an extrusion transformation. The 3-dimensional model of the input text character is compared to 3-dimensional models of candidate characters and the results of the 3-dimensional comparisons are used to select the optical character recognition (OCR) output for the input text character. The 3-dimensional comparison may be performed directly on the 3-dimensional models. Alternatively, a set of 2-dimensional images may be generated for each 3-dimensional model and 2-dimensional comparisons performed. By use of the additional information gathered from the comparisons of the 3-dimensional models, the correct OCR output character can be identified with greater confidence. As a result, the quality of the OCR output is improved, improving the functioning of a computer performing OCR tasks and reducing the expenditure of time and processing power in correcting OCR errors.

20 Claims, 7 Drawing Sheets

(56) References Cited

OTHER PUBLICATIONS

Karani, Dhruvil, "Introduction to Word Embedding and Word2Vec", Published in Towards Data Science, [Online]. Retrieved from the Internet: <URL: https://towardsdatascience.com/introduction-to-word-embedding-and-word2vec-652d0c2060fa>, (Sep. 1, 2018), 8 pgs.

Lopez, Frederico, et al., "Augmenting the User-Item Graph with Textual Similarity Models", arXiv:2109.09358v1, (Sep. 20, 2021), 12 pgs.

Ozuysal, Mustafa, et al., "Fast Keypoint Recognition using Random Ferns", IEEE Transactions on Pattern Analysis and Machine Intelligence, vol. 32, (2010), 14 pgs.

* cited by examiner

OCR USING 3-DIMENSIONAL INTERPOLATION

TECHNICAL FIELD

The subject matter disclosed herein generally relates to optical character recognition (OCR) codes and, more specifically, to OCR using 3-dimensional (3D) interpolation.

BACKGROUND

OCR is a technology that analyzes an image (e.g., an image contained in a raster image file such as a Graphics Interchange Format (GIF) file or a Joint Photographic Experts Group (JPEG) file) to generate text.

DETAILED DESCRIPTION

Figure 1:
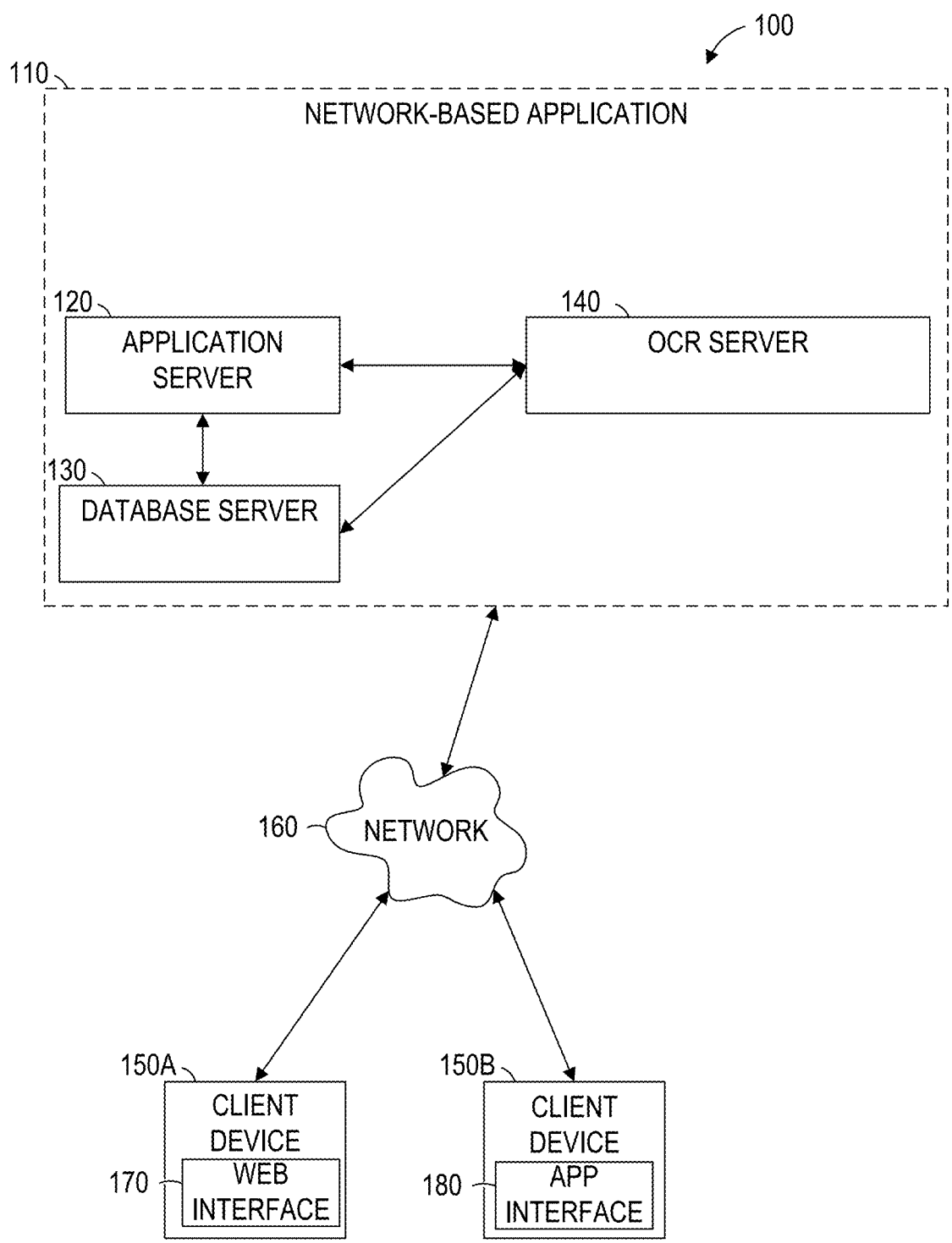
FIG. 1 is a network diagram illustrating an example network environment suitable for OCR using 3D interpolation.

Example methods and systems are directed to OCR using 3D interpolation. Existing methods of performing OCR compare 2-dimensional (2D) images of characters (e.g., characters in an image of a text document) to canonical 2D images of characters (e.g., reference characters for an alphabet). A probability of a match for an input character is determined for each reference character. The reference character having the highest probability of being a match is selected as the OCR output character. Thus, an image of a paper document can be converted, using OCR, to a text file. To avoid converting non-text inputs (e.g., lines, scribbles, dust, or the like) to text characters, image portions having a low probability of matching any reference characters may be prevented from generating a corresponding OCR output.

In performing 2D OCR, a low-quality input character may have a match probability above a predetermined threshold for multiple candidate characters with the match probabilities with a predetermined range of each other. In this case, the confidence that the input character is correctly mapped to the highest probability candidate may be low. For example, a crudely printed letter "t" may have a 75% chance of being the letter "t" and a 73% chance of being the character "+." 3D interpolation may help improve the ability to distinguish between such similar characters.

To perform 3D interpolation, a 3D model of the input text character is generated. For example, the 2D character may be given depth using an extrusion transformation. The 3D model of the input text character is compared to 3D models of the candidate characters and the results of the 3D comparisons are used to select the OCR output for the input text character.

The 3D comparison may be performed directly on the 3D models. Alternatively, a set of 2D images may be generated for each 3D model and 2D comparisons performed. For example, the set may comprise four images, each taken from a different angle (e.g., front, right side, left side, and bottom of the 3D model). By use of the additional information gathered from the comparisons of the 3D models, the correct OCR output character can be identified with greater confidence. As a result, the quality of the OCR output is improved, improving the functioning of a computer performing OCR tasks and reducing the expenditure of time and processing power in correcting OCR errors.

When these effects are considered in aggregate, one or more of the methodologies described herein may obviate a need for certain efforts or resources that otherwise would be involved in performing OCR. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for OCR using 3D interpolation. The network environment 100 includes a network-based application 110, client devices 150A and 150B, and a network 160. The network-based application 110 is provided by an application server 120 in communication with a database server 130. An OCR server 140 is also provided. The application server 120 accesses application data (e.g., application data stored by the database server 130) to provide one or more applications to the client devices 150A and 150B via a web interface 170 or an application interface 180.

The application server 120, the database server 130, the OCR server 140, and the client devices 150A and 150B may each be implemented in a computer system, in whole or in part, as described below with respect to FIG. 7. The client devices 150A and 150B may be referred to collectively as client devices 150 or generically as a client device 150.

The application server 120 provides an application that may include OCR functionality that generates text from images. The images may be captured by a camera of a mobile device (e.g., a cell phone) or accessed from storage of a mobile device, laptop, desktop computer, or server. The application server 120 may access functionality of the OCR server 140 to determine text represented by the image and cause display of the text on a display of the client device 150A or 150B.

The OCR server 140 may identify text depicted in images using 2D analysis (e.g., by providing a 2D input image to trained machine learning model, by determining a degree of similarity between a 2D input image and 2D references images, or any suitable combination thereof) or using 3D interpolation. 3D interpolation may be performed as described in more detail below with regard to FIG. 4.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the OCR server 140, and the client devices 150A-150B are connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
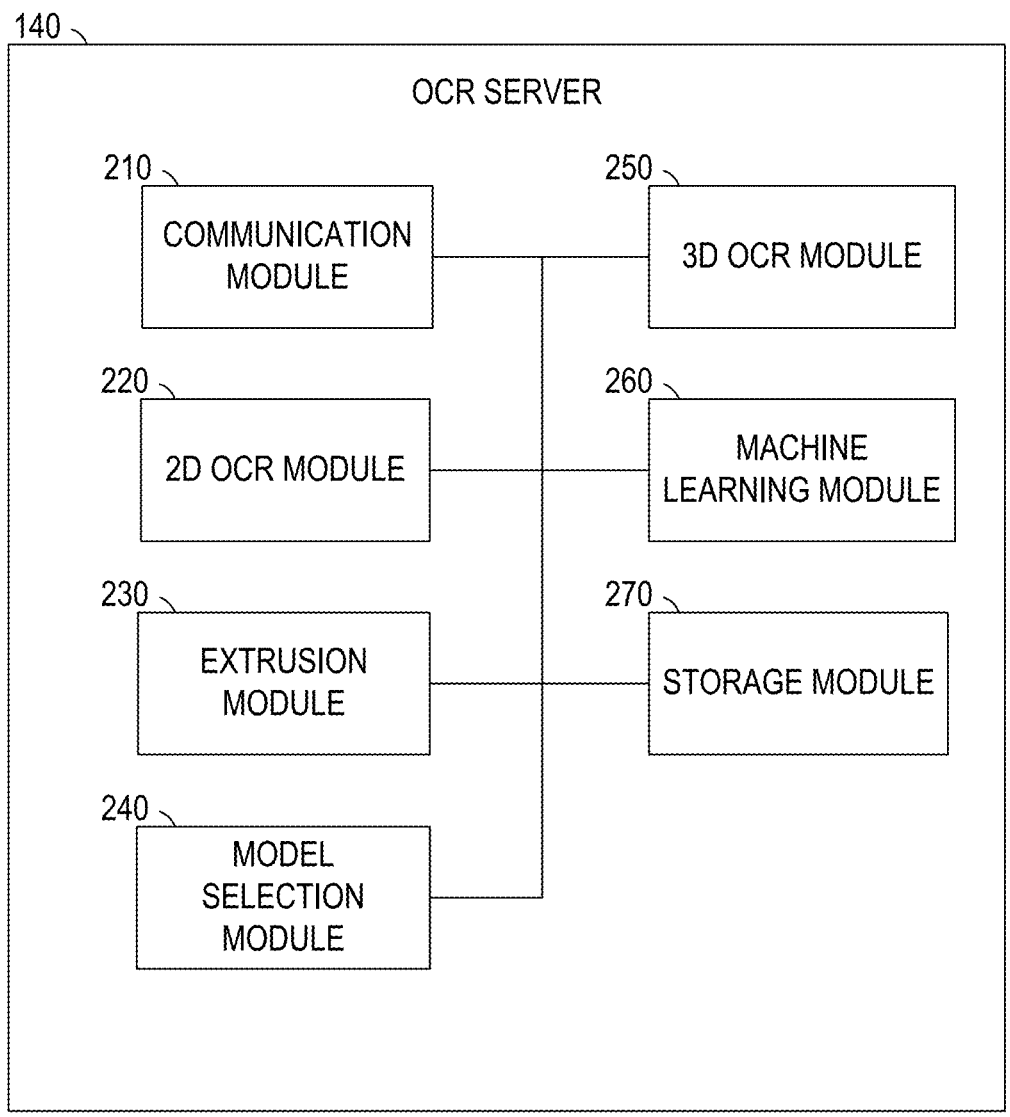
FIG. 2 is a block diagram of an example OCR server, suitable for performing OCR using 3D interpolation.

FIG. 2 is a block diagram of an example OCR server 140, suitable for performing OCR using 3D interpolation. The OCR server 140 is shown as including a communication module 210, a 2D OCR module 220, an extrusion module 230, a model selection module 240, a 3D OCR module 250, a machine-learning module 260, and a storage module 270, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the OCR server 140 and transmits data from the OCR server 140. For example, the communication module 210 may receive, from the application server 120, an image that depicts text. The image may be stored on the OCR server 140 (e.g., on a hard drive) or in remote storage (e.g., a network storage device such as the database server 130). Communications sent and received by the communication module 210 may be intermediated by the network 160.

The 2D OCR module 220 performs OCR on an input image using 2D analysis. For example, the input image may be pre-processed using one or more of binarization, de-skew, line removal, despeckle, font recognition, segmentation, and zoning. Binarization converts a color or grayscale image to a black-and-white image. De-skew aligns the horizontal and vertical axes of the image with reference axes. Line removal removes extraneous lines from the image (e.g., the lines of lined paper). Font recognition recognizes the font of typewritten words or whether handwritten words are printed or cursive, allowing a corresponding OCR algorithm to be used to recognize characters in the text. Segmentation divides the input image (which may contain multiple characters) into smaller images, each containing a single character for recognition. Zoning divides the input image into different zones, such as title, captions, columns, or paragraphs. After pre-processing, the image may be processed using 2D OCR techniques such as matrix matching, feature extraction, or machine-learning.

If the 2D OCR module 220 successfully determines all characters depicted in the input image, the determined text may be provided to the application server 120 via the communication module 210 without further processing. However, if one or more characters are not identified with a high degree of confidence (e.g., a probability of correct match that exceeds a predetermined threshold), 3D processing using the extrusion module 230, the model selection module 240, the 3D OCR module 250, and the machine-learning module 260 may be performed.

The extrusion module 230 generates 3D models from input 2D images. For example, an image representing a single character may be provided as an input to the extrusion module 230 and a 3D model of the single character may be generated as an output of the extrusion module 230. Each image for which a character cannot be identified by the 2D OCR module 220 may be provided to the extrusion module 230 for further processing.

If the extrusion module 230 generates multiple 3D models from the input 2D image, the model selection module 240 selects one or more of the generated models for further processing. For example, if the input image includes speckles, each speckle may result in the creation of a separate 3D model. The model selection module 240 may select the single largest, the two largest, or the three largest 3D models generated by the extrusion module 230 for further processing.

The 3D OCR module 250 evaluates the selected 3D models to determine the character represented by the single-character image. For example, the selected 3D models may be provided as input to the trained machine-learning model generated by the machine-learning module 260, which may generate a character as output. As another example, the trained machine-learning model may receive the selected 3D models as input and generate a vector as output, with each entry in the vector indicating a probability that the input models represent a corresponding character. The character having the highest probability may be selected as the character for the single-character image. If no character has a probability that meets a predetermined threshold, the 3D OCR module 250 may determine that the single-character image does not contain any characters.

Trained machine learning models, text, 3D models, image files, or any suitable combination thereof may be stored and accessed by the storage module 270. For example, local storage of the OCR server 140, such as a hard drive, may be used. As another example, network storage may be accessed by the storage module 270 via the network 160.

Figure 3:
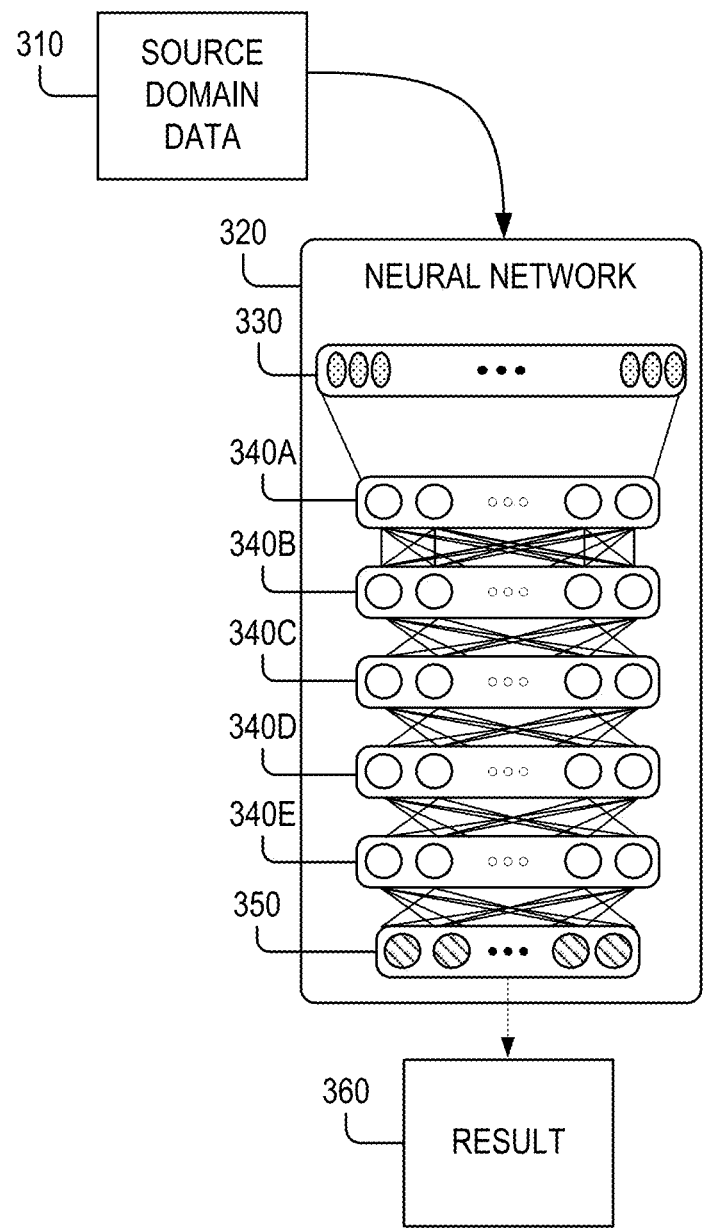
FIG. 3 is a block diagram of an example neural network, suitable for use in performing OCR using 3D interpolation.

FIG. 3 illustrates the structure of an example neural network 320. The neural network 320 takes source domain data 310 as input; processes the source domain data 310 using the input layer 330, the intermediate, hidden layers 340A, 340B, 340C, 340D, and 340E, and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

In a supervised learning phase, a model is developed to predict the output for a given set of inputs and is evaluated over several epochs to more reliably provide the output that is specified as corresponding to the given input for the greatest number of inputs for the training dataset. The training dataset comprises input examples with labeled outputs. For example, a user may label images based on their content and the labeled images may be used to train an image identifying a model to generate the same labels.

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task that the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNN, genetic or evolutionary algorithms, and the like.

Figure 4:
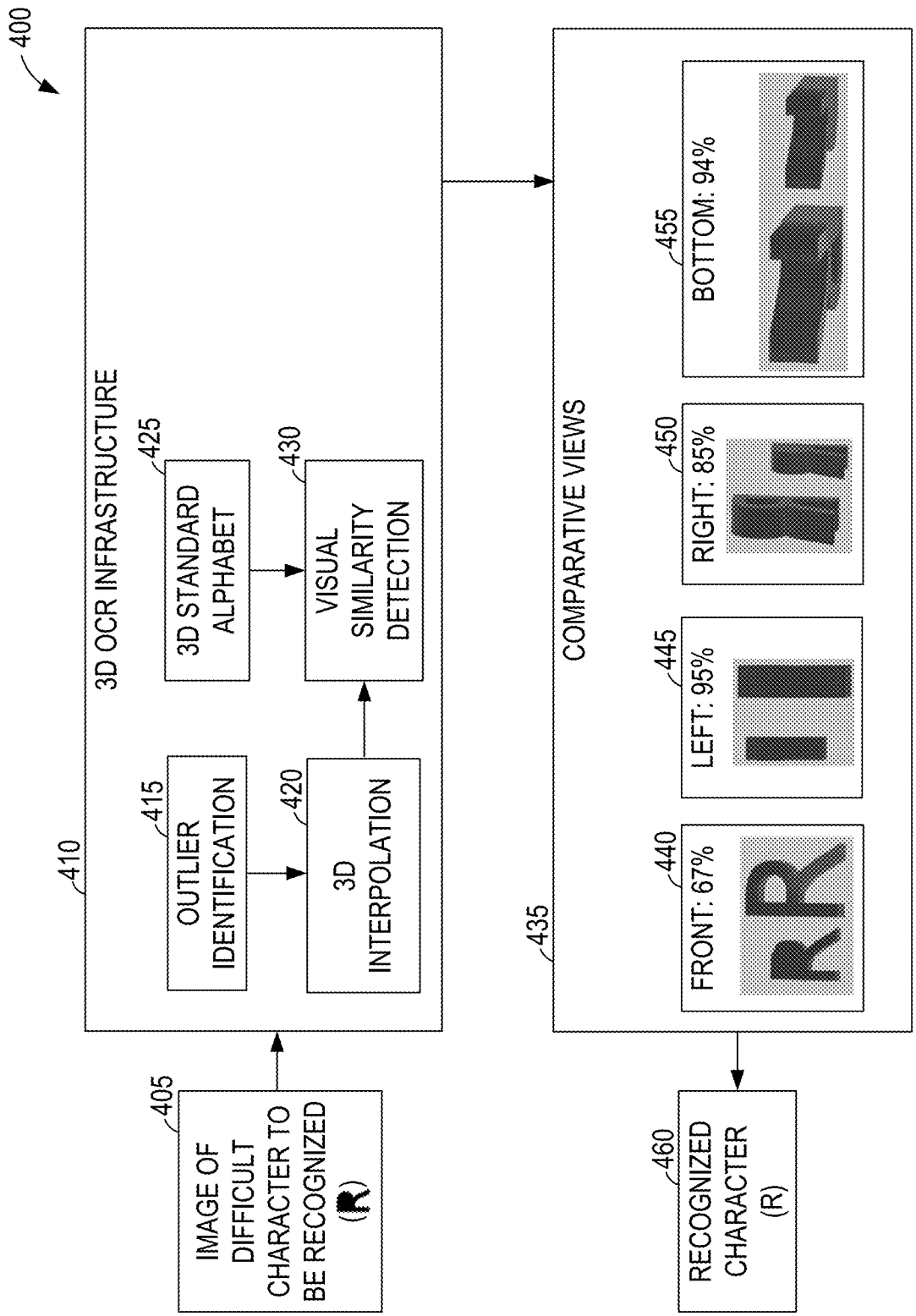
FIG. 4 is a block diagram illustrating a structure for OCR using 3D interpolation.

FIG. 4 is a block diagram illustrating a structure 400 for OCR using 3D interpolation. The structure 400 comprises an image 405 of a difficult character to be recognized, a 3D OCR infrastructure 410, comparative views 435, and a recognized character 460. The 3D OCR infrastructure 410 includes outlier identification 415, 3D interpolation 420, a 3D standard alphabet 425, and visual similarity detection 430. The comparative views 435 include front views 440, left views 445, right views 450, and bottom views 455.

The difficult character may be a capital R with the upper opening filled in. The outlier identification 415 operates on the image 405 to identify and remove stray marks that are depicted before a 3D model of the character is generated. The 3D interpolation 420 generates a 3D model from the image 405 or from a modified version of the image 405 after outliers have been removed. For example, the 3D interpolation 420 may generate a 3D model by extruding the non-white portions of the image to a predetermined depth (e.g., a predetermined percentage of a standard character height, a predetermined percentage of the height of the character being extruded, or a predetermined fixed amount). For example, the predetermined depth may be 10% of the character height, 5 mm, or another amount. The 3D interpolation 420 may convert the image 405 from a raster representation to a vector representation and extrude the vector representation of the image to generate a 3D model.

Alternatively, the 3D interpolation 420 may be performed first, followed by the outlier identification 415. For example, the 3D interpolation 420 may extrude a region of an input image and the outlier identification 415 may identify a plurality of meshes in the extrusion and select the largest mesh of the plurality of meshes as the 3D model of the input text character. To support diacritical markers and other complex characters, the outlier identification 415 may identify a plurality of meshes in the extrusion and select a predetermined number (e.g., 3) of the largest meshes of the plurality of meshes as the 3D model of the input text character. Thus, the outlier identification 415 filters out noise.

Visual similarity detection 430 compares the generated 3D model with models of the 3D standard alphabet 425. For example, two 3D models may be provided to a trained machine-learning model as input and generate a probability that the two models represent the same character as output. As another example, comparative views 435 may be generated, with multiple 2D views for each 3D model generated and compared.

In the example of FIG. 4, the front views 440 are compared by a trained machine-learning model and found to be 67% similar. For example, the OCR server 140 may provide each of the multiple 2D views to a trained machine learning model, either a single trained machine-learning model for all 2D views or a different trained machine-learning model for each 2D view. The trained machine-learning model may also accept the 2D view for the canonical model as an input. Methods described in Fast Keypoint Recognition using Random Ferns, Ozuysal et al. may be used to perform the comparisons.

As can be seen in the images of FIG. 4, the difference between a canonical letter R and a filled letter R is most apparent from the front. The left views 445, right views 450, and bottom views 455 have higher similarity values of 95%, 85%, and 94%, respectively. 2D OCR effectively works only on the front view. Accordingly, using the additional views adds information that serves to allow the character R to be determined as the recognized character 460, improving the OCR capabilities of the OCR server 140 relative to OCR systems that do not make use of 3D interpolation.

The visual similarity detection 430 may be performed for every character in the 3D standard alphabet 425 or to a subset of the 3D standard alphabet 425. For example, a set of characters that are found to be possible matches during 2D OCR processing may be tested further using the 3D OCR infrastructure 410 without performing visual similarity detection 430 on other letters of the 3D standard alphabet 425, saving processing effort over systems that perform visual similarity detection 430 for more characters.

Figure 5:
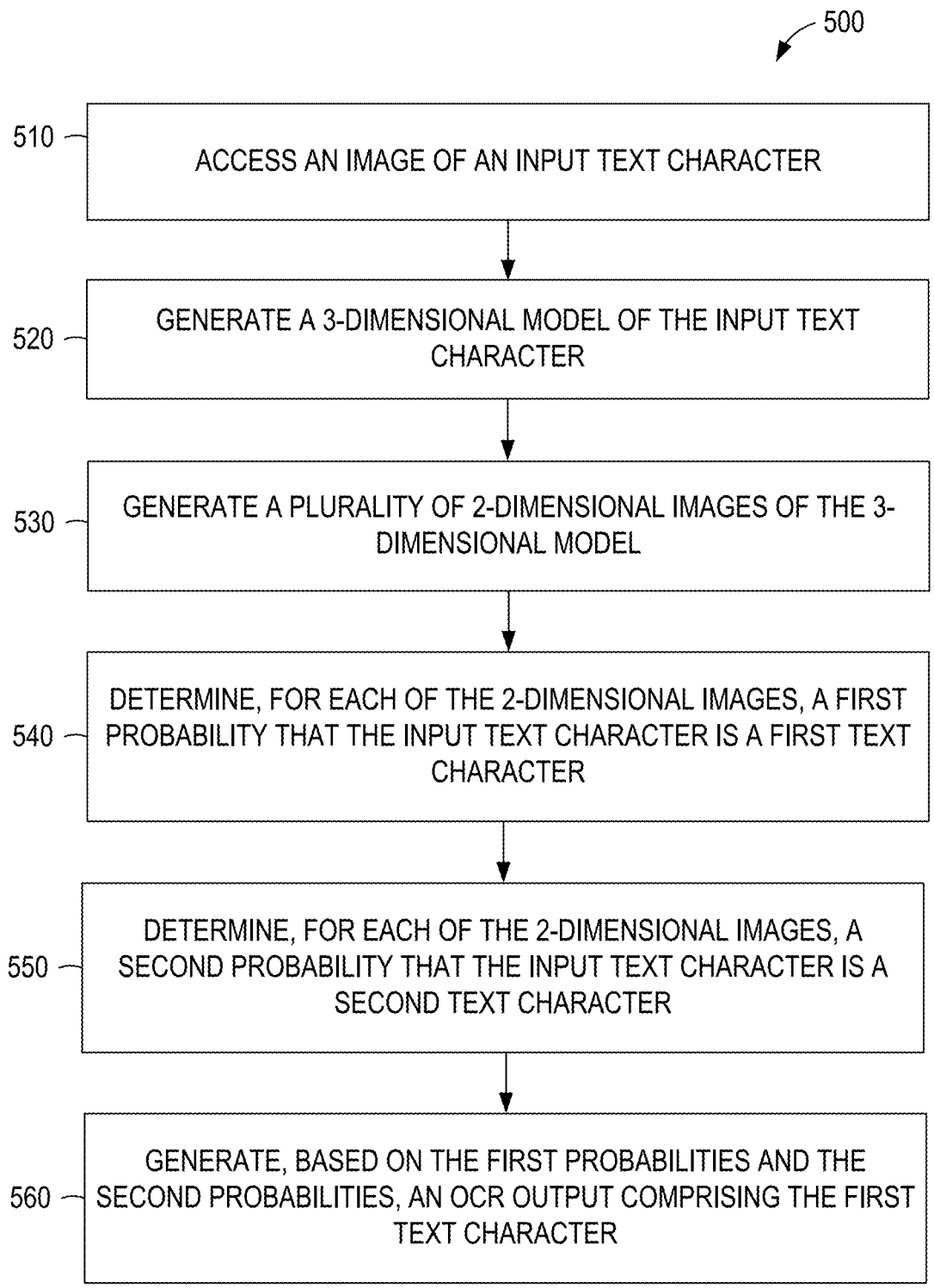
FIG. 5 is a flowchart illustrating operations of an example method suitable for performing OCR using 3D interpolation.

FIG. 5 is a flowchart illustrating operations of an example method 500 suitable for performing OCR using 3D interpolation. The method 500 includes operations 510, 520, 530, 540, 550, and 560. By way of example and not limitation, the method 500 is described as being performed by the OCR server 140 of FIG. 1, using the modules of FIG. 2 and 3D OCR infrastructure of FIG. 4.

The extrusion module 230 accesses an image of an input text character (operation 510) and generates a 3D model of the input text character (operation 520). For example, the image may be a 2D raster image. The 2D raster image may be a bitmap image, in which each pixel is limited to one of two values, commonly referred to as black and white. The 2D raster image may be stored using a high resolution (e.g., 500 dots per inch (dpi) or more). The extrusion module 230 may convert the 2D raster image to a 2D vector image, and then convert the 2D vector image to a 3D model using extrusion to add depth to the image. The vector conversion may be performed using Potrace and, as a further intermediate step, the vector representation may be used to create a vertex curve using Blender prior to extrusion.

In operation 530, the 3D OCR module 250 generates a plurality of 2D images of the 3D model. For example, the 3D model may be rendered at a plurality of orientations using a camera at a predetermined distance from an origin of the 3D model.

The 3D OCR module 250, in operation 540, determines, for each of the 2D images, a first probability that the input text character is a first text character. With reference to FIG. 4, the first text character may be the letter R, the plurality of 2D images may be four 2D images, and the first probabilities that the input text character is the letter R may be 67%, 95%, 85%, and 94%.

The 3D OCR module 250 also determines, for each of the 2D images, a second probability that the input text character is a second text character. For example, the second text character may be the number 4, the plurality of 2D images may be four 2D images, and the second probabilities that the input text character is the number 4 may be 60%, 80%, 75%, and 85%.

In operation 560, the 3D OCR module 250 generates, based on the first probabilities and the second probabilities, an OCR output comprising the first text character. For example, the average of the first probabilities may be taken as a probability that the input text character is the first text character and the average of the second probabilities may be taken as a probability that the input text character is the second text character. Based on the probability that the input text character is the first text character exceeding the probability that the input text character is the second text character, the 3D OCR module 250 selects the first text character as the output character for the input image.

The selected output character for the image may be combined with OCR results for other characters in an original, larger image to generate an OCR output containing text for all characters in the original image.

In view of the above-described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: accessing, by one or more processors, an image of an input text character; generating, by the one or more processors, a 3D model of the input text character; generating, by the one or more processors, a plurality of 2D images of the 3D model, each of the 2D images comprising a view of the 3D model from a different angle; determining, by the one or more processors, for each of the 2D images, a first probability that the input text character is a first text character; determining, by the one or more processors, for each of the 2D images, a second probability that the input text character is a second text character; and generating, by the one or more processors, based on the first probabilities and the second probabilities, an OCR output comprising the first text character.

In Example 2, the subject matter of Example 1, wherein the generating of the 3D model of the input text character comprises extruding the input text character to a predetermined depth.

In Example 3, the subject matter of Examples 1-2, wherein the determining, for each of the 2-dimensional images, the first probability that the input text character is the first text character comprises providing the 2-dimensional image to a trained machine learning model.

In Example 4, the subject matter of Examples 1-3, wherein the generating of the plurality of 2D images comprises generating four 2D images.

In Example 5, the subject matter of Examples 1-4, wherein the generating of the 3D model of the input text character comprises: extruding a region of the image; identifying a plurality of meshes in the extrusion; and selecting the largest mesh of the plurality of meshes as the 3D model of the input text character.

In Example 6, the subject matter of Examples 1-5, wherein the generating of the 3D model of the input text character comprises: converting the image of the input text character from a raster representation to a vector representation; and extruding the vector representation of the image of the input text character.

In Example 7, the subject matter of Examples 1-6, wherein the generating of the 3D model of the input text character comprises: extruding a region of the image; identifying a plurality of meshes in the extrusion; and selecting the largest three meshes of the plurality of meshes as the 3D model of the input text character.

In Example 8, the subject matter of Examples 1-7, wherein the generating of the plurality of 2D images comprises generating four 2D images being generated from front, right, left, and bottom camera views.

Example 9 is a system comprising: a memory that stores instructions; and one or more processors configured by the instructions to perform operations comprising: accessing an image of an input text character; generating a 3D model of the input text character; generating a plurality of 2D images of the 3D model, each of the 2D images comprising a view of the 3D model from a different angle; determining for each of the 2D images, a first probability that the input text character is a first text character; determining for each of the 2D images, a second probability that the input text character is a second text character; and generating, based on the first probabilities and the second probabilities, an OCR output comprising the first text character.

In Example 10, the subject matter of Example 9, wherein the generating of the 3D model of the input text character comprises extruding the input text character to a predetermined depth.

In Example 11, the subject matter of Examples 9-10, wherein the determining, for each of the 2D images, the first probability that the input text character is the first text character comprises providing the 2D image to a trained machine learning model.

In Example 12, the subject matter of Examples 9-11, wherein the generating of the plurality of 2D images comprises generating four 2D images.

In Example 13, the subject matter of Examples 9-12, wherein the generating of the 3D model of the input text character comprises: extruding a region of the image; identifying a plurality of meshes in the extrusion; and selecting the largest mesh of the plurality of meshes as the 3D model of the input text character.

In Example 14, the subject matter of Examples 9-13, wherein the generating of the 3D model of the input text character comprises: converting the image of the input text character from a raster representation to a vector representation; and extruding the vector representation of the image of the input text character.

In Example 15, the subject matter of Examples 9-14, wherein the generating of the 3D model of the input text character comprises: extruding a region of the image; identifying a plurality of meshes in the extrusion; and selecting the largest three meshes of the plurality of meshes as the 3D model of the input text character.

In Example 16, the subject matter of Examples 9-15, wherein the generating of the plurality of 2D images comprises generating four 2D images, the 2D images being generated from front, right, left, and bottom camera views.

Example 17 is a non-transitory computer-readable medium that stores instructions that, when executed by one or more processors, cause the one or more processors to perform operations comprising: accessing an image of an input text character; generating a 3D model of the input text character; generating a plurality of 2D images of the 3D model, each of the 2D images comprising a view of the 3D model from a different angle; determining for each of the 2D, a first probability that the input text character is a first text character; determining for each of the 2D images, a second probability that the input text character is a second text character; an generating, based on the first probabilities and the second probabilities, an OCR output comprising the first text character.

In Example 18, the subject matter of Example 17, wherein the generating of the 3D model of the input text character comprises extruding the input text character to a predetermined depth.

In Example 19, the subject matter of Examples 17-18, wherein the determining, for each of the 2D images, the first probability that the input text character is the first text character comprises providing the 2D image to a trained machine learning model.

In Example 20, the subject matter of Examples 17-19, wherein the generating of the plurality of 2D images comprises generating four 2D images.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 6:
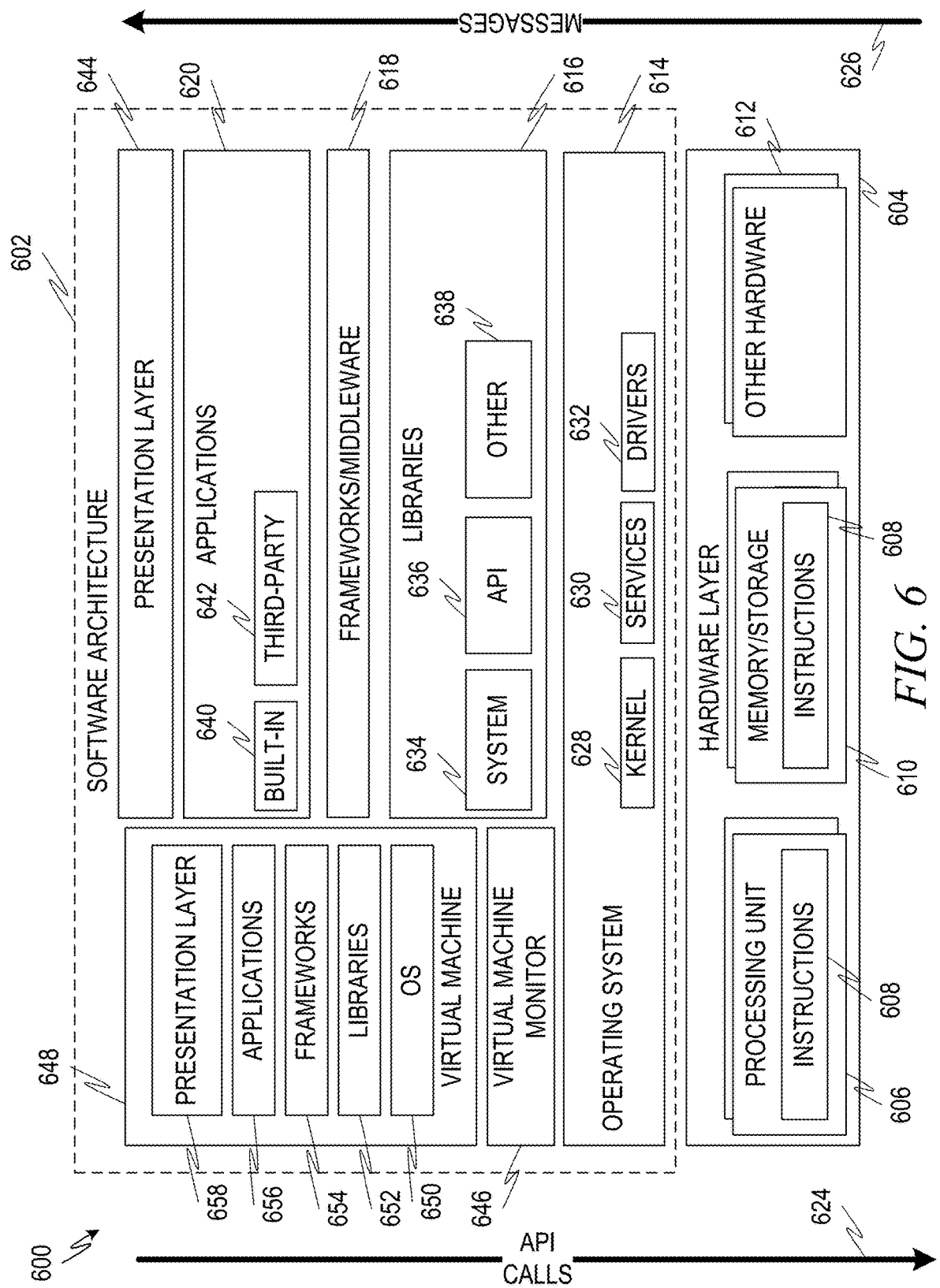
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 6.

The representative hardware layer 604 comprises one or more processing units 606 having associated executable instructions 608. Executable instructions 608 represent the executable instructions of the software architecture 602, including implementation of the methods, modules, subsystems, and components, and so forth described herein. The representative hardware layer 604 may also include memory and/or storage modules 610, which also have executable instructions 608. Hardware layer 604 may also comprise other hardware as indicated by other hardware 612, which represents any other hardware of the hardware layer 604, such as the other hardware illustrated as part of the software architecture 602.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and presentation layer 644. Operationally, the applications 620 and/or other components within the layers may invoke application programming interface (API) calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware 618 may provide a higher-level common infrastructure that may be utilized by the applications 620 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system libraries 634, API libraries 636, and other libraries 638), frameworks/middleware 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656, and/or presentation layer 658. These layers of software architecture executing within the virtual machine 648 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 7:
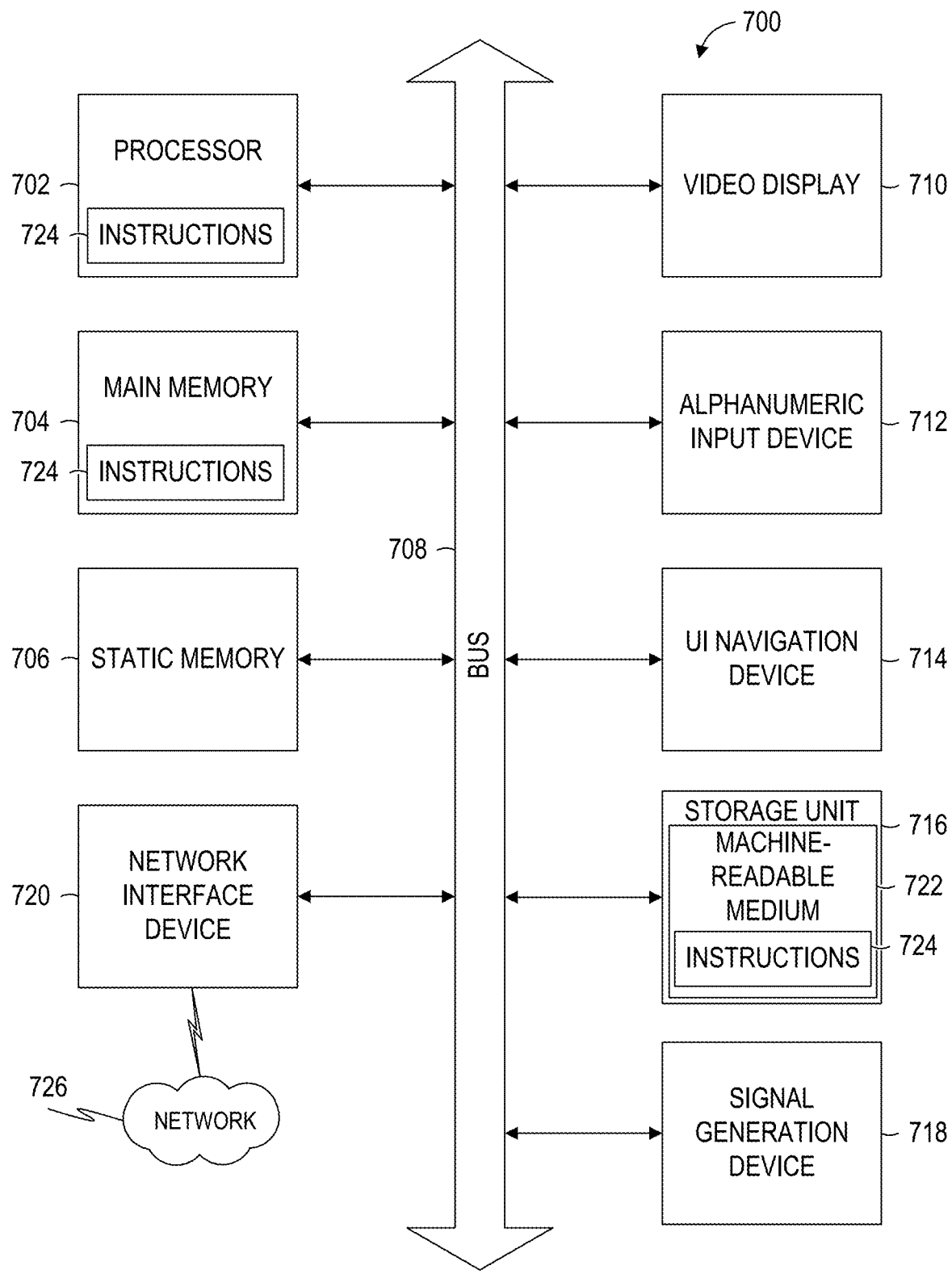
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface navigation (or cursor control) device 714 (e.g., a mouse), a storage unit 716, a signal generation device 718 (e.g., a speaker), and a network interface device 720.

Machine-Readable Medium

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in FIG. 7 to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 724 may further be transmitted or received over a communications network 726 using a transmission medium. The instructions 724 may be transmitted using the network interface device 720 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    accessing, by one or more processors, an image of an input text character;
    generating, by the one or more processors, a 3-dimensional model of the input text character;
    generating, by the one or more processors, a plurality of 2-dimensional images of the 3-dimensional model, each of the 2-dimensional images comprising a view of the 3-dimensional model from a different angle;
    determining, by the one or more processors, for each of the 2-dimensional images, a first probability that the input text character is a first text character;
    determining, by the one or more processors, for each of the 2-dimensional images, a second probability that the input text character is a second text character; and
    generating, by the one or more processors, based on the first probabilities and the second probabilities, an optical character recognition (OCR) output comprising the first text character.

2. The method of claim 1, wherein the generating of the 3-dimensional model of the input text character comprises extruding the input text character to a predetermined depth.

3. The method of claim 1, wherein the determining, for each of the 2-dimensional images, the first probability that the input text character is the first text character comprises providing the 2-dimensional image to a trained machine learning model.

4. The method of claim 1, wherein the generating of the plurality of 2-dimensional images comprises generating four 2-dimensional images.

5. The method of claim 1, wherein the generating of the 3-dimensional model of the input text character comprises:
    extruding a region of the image;
    identifying a plurality of meshes in the extrusion; and
    selecting the largest mesh of the plurality of meshes as the 3-dimensional model of the input text character.

6. The method of claim 1, wherein the generating of the 3-dimensional model of the input text character comprises:
    converting the image of the input text character from a raster representation to a vector representation; and
    extruding the vector representation of the image of the input text character.

7. The method of claim 1, wherein the generating of the 3-dimensional model of the input text character comprises:
    extruding a region of the image;
    identifying a plurality of meshes in the extrusion; and
    selecting the largest three meshes of the plurality of meshes as the 3-dimensional model of the input text character.

8. The method of claim 1, wherein the generating of the plurality of 2-dimensional images comprises generating four 2-dimensional images, the 2-dimensional images being generated from front, right, left, and bottom camera views.

9. A system comprising:
a memory that stores instructions; and
one or more processors configured by the instructions to perform operations comprising:
  accessing an image of an input text character;
  generating a 3-dimensional model of the input text character;
  generating a plurality of 2-dimensional images of the 3-dimensional model, each of the 2-dimensional images comprising a view of the 3-dimensional model from a different angle;
  determining for each of the 2-dimensional images, a first probability that the input text character is a first text character;
  determining for each of the 2-dimensional images, a second probability that the input text character is a second text character; and
  generating, based on the first probabilities and the second probabilities, an optical character recognition (OCR) output comprising the first text character.

10. The system of claim 9, wherein the generating of the 3-dimensional model of the input text character comprises extruding the input text character to a predetermined depth.

11. The system of claim 9, wherein the determining, for each of the 2-dimensional images, the first probability that the input text character is the first text character comprises providing the 2-dimensional image to a trained machine learning model.

12. The system of claim 9, wherein the generating of the plurality of 2-dimensional images comprises generating four 2-dimensional images.

13. The system of claim 9, wherein the generating of the 3-dimensional model of the input text character comprises:
  extruding a region of the image;
  identifying a plurality of meshes in the extrusion; and
  selecting the largest mesh of the plurality of meshes as the 3-dimensional model of the input text character.

14. The system of claim 9, wherein the generating of the 3-dimensional model of the input text character comprises:
  converting the image of the input text character from a raster representation to a vector representation; and
  extruding the vector representation of the image of the input text character.

15. The system of claim 9, wherein the generating of the 3-dimensional model of the input text character comprises:
  extruding a region of the image;
  identifying a plurality of meshes in the extrusion; and
  selecting the largest three meshes of the plurality of meshes as the 3-dimensional model of the input text character.

16. The system of claim 9, wherein the generating of the plurality of 2-dimensional images comprises generating four 2-dimensional images, the 2-dimensional images being generated from front, right, left, and bottom camera views.

17. A non-transitory computer-readable medium that stores instructions that, when executed by one or more processors, cause the one or more processors to perform operations comprising:
  accessing an image of an input text character;
  generating a 3-dimensional model of the input text character;
  generating a plurality of 2-dimensional images of the 3-dimensional model, each of the 2-dimensional images comprising a view of the 3-dimensional model from a different angle;
  determining for each of the 2-dimensional images, a first probability that the input text character is a first text character;
  determining for each of the 2-dimensional images, a second probability that the input text character is a second text character; an generating, based on the first probabilities and the second probabilities, an optical character recognition (OCR) output comprising the first text character.

18. The non-transitory computer-readable medium of claim 17, wherein the generating of the 3-dimensional model of the input text character comprises extruding the input text character to a predetermined depth.

19. The non-transitory computer-readable medium of claim 17, wherein the determining, for each of the 2-dimensional images, the first probability that the input text character is the first text character comprises providing the 2-dimensional image to a trained machine learning model.

20. The non-transitory computer-readable medium of claim 17, wherein the generating of the plurality of 2-dimensional images comprises generating four 2-dimensional images.

* * * * *